Patented Jan. 26, 1932

1,842,843

UNITED STATES PATENT OFFICE

FRITZ ROTHE AND HANS BRENEK, OF BERLIN, GERMANY, ASSIGNORS TO RHENANIA-KUNHEIM VEREIN CHEMISCHER FABRIKEN AKTIENGESELLSCHAFT, OF BERLIN, GERMANY, A CORPORATION OF GERMANY

METHOD OF MAKING FERTILIZERS

No Drawing. Application filed July 19, 1927, Serial No. 207,014, and in Germany July 30, 1926.

This invention relates to a method of making a fertilizer by decomposition, particularly by conversion of phosphates at higher temperatures.

In our prior applications, Ser. Nos. 18915 and 164121 we have described methods of making a fertilizer by calcining, for example, at 1200° C. phosphorites in presence of silica and certain amounts of alkaline reacting alkali metal salts especially alkali metal carbonate. The mixtures of the different raw materials to be heated preferably contain substantially such an amount of silica, as is required, to convert one mol. CaO of the tricalciumphosphate, $(CaO)_3.P_2O_5$, into a silicate of the combination $(CaO)_2.SiO_2$ and at least such an amount of alkali metal salt, as is required to replace the mol. CaO leaving the phosphate by alkali metal oxide. This reaction is preferably carried out in the presence of steam.

According to the invention the alkaline reacting alkali metal compounds in the above described process may be partly replaced by non-alkaline reacting alkali metal salts of a strong inorganic acid such as alkali metal sulfates, alkali metal chlorides or mixtures of sulfates and chlorides. The acid components of these substances are expelled during the calcination and may be recovered according to the usual methods. The invention has the advantage that instead of using uniform salts such as carbonates, mixtures of these salts with sulfates or chlorides or both may be employed. These mixtures often are obtained in technical process or may be found in natural state such as the trona in Egypt.

The decomposition process is preferably carried out in presence of steam, which for example may be wholly or partly introduced into the process, by using for the calcination fuels rich in hydrogen such as water gas, oil, or the like, which on being burnt supply the required steam. When the raw phosphates used contain considerable amounts of gypsum, the addition of small amounts of reducing substances such as coal to the mixture to be calcined has been found to be of advantage, in order to obtain an easier conversion of steam.

Examples

1. A mixture consisting of 100 parts of a north-African phosphate, 10 parts of sand and 23.5 parts of a sodium carbonate—sodium chloride mixture, containing 60% $Na_2CO_3$ and 40% NaCl, was calcined at, for example, 1200° C. in presence of steam. The product obtained by the calcination was free of chlorine; it contained 26.7% citrate—soluble phosphoric acid for the 27.4% total phosphoric acid.

2. A mixture consisting of 100 parts of a north-African phosphate, 10 parts of sand and 25 parts of a mixture of 60% sodium carbonate and 40% sodium sulfate was calcined at about 1200° C. in presence of steam. The calcined product contained 26.8% $P_2O_5$ soluble in ammonium citrate for a total of 27.3% $P_2O_5$.

We claim:

1. A method for making a fertilizer by calcining at about 1200° C. a mixture of raw phosphate, silica, alkali metal carbonate and a salt selected from the group consisting of an alkali metal chloride and alkali metal sulphate, in which mixture there is present at least such an amount of silica as is required for converting one mol. CaO of the tricalcium-phosphate into a silicate of the formula $2 CaO.SiO_2$ and at least such an amount of alkali metal salts as is required to replace the mol. CaO leaving the phosphate by alkali metal oxide.

2. A method of making a fertilizer according to claim 1 in which steam is present during the reaction.

3. A method of making a fertilizer according to claim 1 in which a part of the necessary silica is added by using a phosphorite rich in silica.

In testimony whereof we affix our signatures.

FRITZ ROTHE.
HANS BRENEK.